United States Patent [19]
Miyazaki et al.

[11] Patent Number: 5,966,360
[45] Date of Patent: Oct. 12, 1999

[54] CLEANING DISC CARTRIDGE

[75] Inventors: Yukio Miyazaki; Masaru Ikebe; Takateru Satoh, all of Saku; Mitsuo Watanabe, Komoro; Haruo Shiba, Komoro; Toshihiko Ishida, Komoro, all of Japan

[73] Assignee: TDK Corporation, Tokyo, Japan

[21] Appl. No.: 08/920,021

[22] Filed: Aug. 26, 1997

Related U.S. Application Data

[63] Continuation of application No. 08/573,573, Dec. 15, 1995, abandoned, which is a continuation of application No. 08/252,919, Jun. 2, 1994, abandoned.

[30] Foreign Application Priority Data

| Jun. 3, 1993 | [JP] | Japan | 5-034894 |
| Jun. 21, 1993 | [JP] | Japan | 5-173759 |
| Jul. 9, 1993 | [JP] | Japan | 5-192974 |
| Dec. 15, 1993 | [JP] | Japan | 5-343097 |
| Dec. 15, 1993 | [JP] | Japan | 5-343098 |

[51] Int. Cl.⁶ ............... G11B 5/41; G11B 23/00; G11B 7/12
[52] U.S. Cl. ........................... 369/71; 369/292
[58] Field of Search ............... 369/71, 292; 360/128, 360/132, 137; 15/256.5, 214, 256.6, DIG. 12, DIG. 14

[56] References Cited

U.S. PATENT DOCUMENTS

| 4,065,798 | 12/1977 | Sugisaki et al. | 360/128 |
| 4,408,241 | 10/1983 | Ogawa | 360/128 |
| 4,868,700 | 9/1989 | Fritsch et al. | 360/128 |
| 4,870,636 | 9/1989 | Yamamoto et al. | 369/292 |

FOREIGN PATENT DOCUMENTS

| 5860424 | 4/1983 | Japan . | |
| 5862819 | 4/1983 | Japan | 360/128 |
| 6390018 | 4/1988 | Japan | 360/128 |
| 63-136371 | 6/1988 | Japan . | |
| 63-102013 | 7/1988 | Japan . | |
| 1204209 | 8/1989 | Japan | 360/128 |
| 143386 | 9/1989 | Japan . | |
| 2232878 | 9/1990 | Japan | 360/137 |
| 0312810 | 1/1991 | Japan | 360/128 |
| 0316070 | 1/1991 | Japan | 360/137 |
| 35908 | 1/1991 | Japan | 360/128 |
| 3207067 | 9/1991 | Japan | 360/137 |
| 0411372 | 1/1992 | Japan | 360/137 |
| 5342669 | 12/1993 | Japan . | |
| 620295 | 1/1994 | Japan . | |
| 2263997 | 1/1992 | United Kingdom . | |
| 9102350 | 2/1991 | WIPO | 360/128 |

*Primary Examiner*—William J. Klimowicz
*Attorney, Agent, or Firm*—Price Gess & Ubell

[57] ABSTRACT

A cleaning disc cartridge capable of concurrently cleaning both a magnetic head of a magneto-optical disc apparatus and an optical lens thereof without causing any error in reading of a signal. A rotating disc is provided on one surface thereof opposite to a magnetic head of the apparatus with a head cleaning member and on the other surface thereof opposite to an objective lens of the apparatus with lens cleaning members. The rotating disc includes a disc body which is provided with an inventory region defined on an inner peripheral side of a lens cleaning member arrangement region, a reproduction-only region defined on an outer peripheral side of the lens cleaning member arrangement region, and an information recording and reproducing region outside the reproduction-only region.

15 Claims, 12 Drawing Sheets

F I G. 10(b)
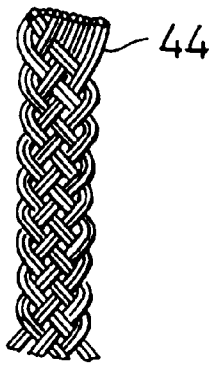
F I G. 10(c)
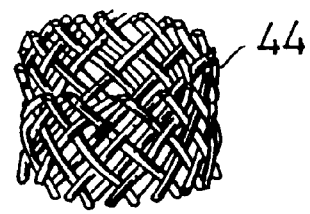
F I G. 11
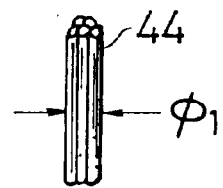

CLEANING DISC CARTRIDGE

This is a continuation of application Ser. No. 08/573,573, filed on Dec. 15, 1995, now abandoned, which is a continuation of Ser. No. 08/252,919, filed on Jun. 2, 1994, now abandoned.

BACKGROUND OF THE INVENTION

1. Field of the Invention

This invention relates to a cleaning disc cartridge adapted to remove, from a magnetic head, an optical lens or the like incorporated in an information receiving and reproducing system such as an optical disc apparatus, a magneto-optical disc apparatus or the like, any foreign matter or pollutant such as dust, shavings or the like adhered thereto to clean it and be effectively applicable to cleaning of both an information recording and reproducing apparatus and a reproduction-only apparatus exclusively used for reproduction of information, and more particularly to a cleaning disc cartridge for an optical disc apparatus or an optical-magnetic disc apparatus which includes both a lens cleaning member and a head cleaning member and is applicable to not only an information recording and/or reproducing apparatus including a magnetic head and a lens but an information reproducing apparatus exclusively used for the reproduction.

2. Description of Related Art

A conventional cleaning disc cartridge includes a disc-like cleaning sheet formed into the same configuration as a conventional disc such as a magnetic disc or a magneto-optical disc. The cleaning sheet is rotated while being contacted with a magnetic head or a lens, to thereby clean it. The cleaning sheet used for cleaning the magnetic head comprises a disc coated with an abrasive or a water absorbing disc impregnated with a cleaning liquid. A foreign matter adhered to an optical lens incorporated in an optical information recording and reproducing system utilizing laser beams is removed by means of a cleaning disc having a brush provided on one surface thereof to keep the head or lens clean.

Unfortunately, cleaning of an objective lens for an optical pickup and a magnetic head incorporated in an information recording and reproducing system using a magneto-optical disc cartridge must be carried out separately using a cleaning disc member exclusively used for the lens and that a cleaning disc member exclusively used for the head, therefore, the cleaning is highly troublesome. In view of the problem, it would be considered to provide a disc with both a cleaning member for the lens and a cleaning member for the head to concurrently clean the lens and head. However, such arrangement of both cleaning members on the disc adversely affects an inventory region and an information recording and reproducing region defined on the disc to cause an error in reading of a signal. Also, such an approach only permits the cleaning disc to be applicable to an information recording and reproducing apparatus including an objective lens and a magnetic head but fails to permit it to be applicable to a reproduction-only apparatus exclusively used for reproduction of information which includes only an objective lens.

Also, there has been conventionally known a cleaning disc which includes a brush-like cleaning member made of fine fibers bundled and provided on a surface thereof opposite to a pickup lens, as disclosed in Japanese Patent Publication No. 43386/1989. Also, a cleaning disc of another type is conventionally known in the art which includes a brush-like cleaning member made of a warp of a woven fabric or a weft thereof depending on a direction of mounting of the member on the cleaning disc. Further, a cleaning disc including a brush-like cleaning member formed of cotton, wool or the like embedded on a surface of the disc is likewise known in the art.

Unfortunately, the conventional cleaning discs described above each fail to exhibit satisfactory endurance because the cleaning member or brush readily falls or expands at a tip end thereof in all directions, leading to rapid deterioration in cleaning function. Also, such deformation of the brush is often judged to be abnormality occurring on a surface of the disc and causes fillings thereof to protrude into a region of the disc adjacent to a skip region thereof, leading to a failure in slip operation of a player.

Also, for the purpose of removing any foreign matter or pollutant such as dust or the like adhered to an optical lens incorporated in an information recording and reproducing system of the optical type, a lens cleaner is proposed which includes a disc and a brush provided on one surface of the disc for removing the foreign matter or pollutant. The lens cleaner for the optical disc player or apparatus is not adapted to be used while being received in a cartridge, therefore, it is not required to consider deformation of the brush. However, a cartridge-type lens cleaner wherein a disc mounted thereon with a brush made of nylon fibers is semipermanently housed in a cartridge shell causes the brush to be deformed, to thereby fail to remove a foreign matter or a pollutant such as dust, dew or the like adhered to the optical lens of the optical disc player, resulting in failing to exhibit a satisfactory cleaning function or causing optical performance of the optical disc player to deteriorated. It may be considered that the brush could be formed of a fiber material increased in elasticity or hardness, however, the fiber material substantially abrades an inner surface of a cartridge shell contacted therewith to cause production of white powder with the, resulting cleaning by the brush being highly deteriorated.

Further, a cleaning disc is conventionally proposed which includes a disc body and a cleaning member made of a nonwoven fabric material and applied to a surface of the disc body opposite to a magnetic head of an information recording and reproducing apparatus for cleaning the head, as disclosed in Japanese Utility Model Application Laid-Open Publication No. 102013/1988. Alternatively, the cleaning member may be formed of an abrasive applied to the surface of the disc body, as disclosed in Japanese Patent Application Laid-Open Publication No. 60424/1983. The former cleaning member made of a nonwoven fabric exhibits a favorable cleaning function with respect to a plane surface of the head but fails to satisfactorily clean a narrow recess on the head. Also, it fails to be evenly contacted with the head because the non-woven fabric has some roughness inherently formed thereon and causes an adhesive used for the nonwoven fabric to the disc body to be adhered to the head as well, leading to occurrence of an error during operation of the recording and reproducing apparatus. The latter cleaning member made of an abrasive is adapted to abrade the magnetic head, to thereby clean it. Unfortunately, abrasion of the head produces dust, which often leads to damage to the head. Also, when the latter cleaning member is arranged on the disc body which comprises a small-sized magneto-optical disc, the disc is operated in a magneto-optical disc apparatus while being contacted with not a magnetic head but a head holder. Unfortunately, this causes the abrasive of the cleaning member to abrade the head holder, resulting in abrasion of the magnetic head.

In general, a disc cartridge is transported, stored and sold while being kept in a casing. Such a casing conventionally used for this purpose is formed of a transparent material and includes a casing body of a rectangular shape in which a disc cartridge or a disc cassette is received and a cover of a rectangular shape openably or pivotally mounted on the casing body. Also, the conventional casing is provided therein with a plurality of support elements in a manner to be opposite to each other and elastically deformable, resulting in interposedly supporting the cartridge therebetween. A lens cleaner of the disc cartridge type, as described above, causes a disc provided with a brush to be semipermanently received in a cartridge shell, so that the brush is deformed to a degree that prohibits the removal of a foreign matter or pollutant adhered to the lens. In particular, as shown in FIG. 24, when a disc 100 mounted thereon with a brush 102 is held through support elements 104 in the casing 106 while being received in a cartridge shell 108 and kept facing down, a weight of the disc 100 causes the brush 102 to be pressed against an inner bottom surface of the cartridge shell 108, resulting in the brush 102 being subject to deformation such as bending, settling or the like. Thus, the conventional casing for the cleaning disc cartridge substantially fails to permit the cleaning disc to exhibit a satisfactory function as a magneto-optical disc widely and commonly used in an information recording and reproducing apparatus using laser beams.

SUMMARY OF THE INVENTION

The present invention has been made in view of the foregoing disadvantage of the prior art.

It is an object of the present invention to provide a cleaning disc cartridge for a magneto-optical disc apparatus which is capable of concurrently and efficiently cleaning both a magnetic head of the apparatus and an objective lens thereof while ensuring positive reading of a signal free of any error.

It is another object of the present invention to provide a cleaning disc cartridge which is capable of being effectively applicable to an information recording and reproducing apparatus including both an objective lens and a magnetic head, as well as a reproduction-only apparatus including only an objective lens.

It is a further object of the present invention to provide a cleaning disc cartridge which is capable of facilitating removal of any foreign matter or pollutant adhered to an object to be kept cleaned while ensuring high performance of the object.

It is still another object of the present invention to provide a cleaning disc cartridge for a magneto-optical disc apparatus or an optical disc apparatus which is capable of effectively cleaning of a magneto-optical disc or an optical disc while exhibiting the above-described object.

It is yet another object of the present invention to provide a cleaning disc cartridge which includes a cleaning brush made of a fine fiber material flexible sufficiently to permit it to exhibit satisfactory restoring force, to thereby provide a cleaning disc with sufficient durability and eliminate a failure in skip operation of a disc apparatus or player.

It is even another object of the present invention to provide a cleaning disc cartridge for an optical disc apparatus which is capable of effectively removing any foreign matter or pollutant adhered to an optical lens of the disc apparatus, exhibiting satisfactory durability irrespective of being the cartridge type and exhibiting high performance.

It is a still further object of the present invention to provide a cleaning disc cartridge which is capable of not only adequately cleaning a magnetic head irrespective of a configuration of the head while keeping frictional resistance to the head at an appropriate level but eliminating occurrence of any error in operation of a disc apparatus or player due to adhesion to the head and reducing load applied to a disc drive motor of the disc player.

It is a yet further object of the present invention to provide a casing for a cleaning disc cartridge which is capable of positively preventing deformation of a brush of a cleaning disc received in the casing, facilitating handling of the cleaning disc cartridge, and ensuring cleaning operation of the cleaning disc cartridge.

In accordance with one aspect of the present invention, a cleaning disc cartridge for an optical disc apparatus is provided. The cleaning disc cartridge includes a cartridge shell formed with an opening for an optical pickup, a rotating disc rotatably received in the cartridge shell, and at least one cleaning member provided on a surface of the rotating disc opposite to an objective lens of the optical disc apparatus. The cleaning member includes spun yarns formed of a plurality of fiber bundles each formed of a plurality of fine fibers by spinning and planted on the surface of the rotating disc in a brush-like manner.

In a preferred embodiment of the present invention the spun yarns are arranged in such a manner that fillings formed of the spun yarns so as to be projected from the surface of the rotating disc each have a length larger by 0.3 to 1.5 mm than a distance between the objective lens of the optical disc apparatus and the surface of the rotating disc.

In a preferred embodiment of the present invention, the fibers are 0.1 to 0.5 denier in size.

In a preferred embodiment of the present invention, the rotating disc includes a disc body provided thereon with an information region on which optical information or an optical signal is stored.

In a preferred embodiment of the present invention, the information region of the disc body includes an inventory region and a reproduction-only region defined on an outer peripheral side of the inventory region, wherein the cleaning member is arranged on a region of the disc body defined outside the inventory region and at least a part of the reproduction-only region is positioned on an outside of the region of the disc body on which the cleaning member is arranged.

In a preferred embodiment of the present invention, the region of the disc body on which the cleaning member is arranged is a skip area formed in the reproduction-only region.

In a preferred embodiment of the present invention, the region of the disc body on which the cleaning member is arranged is a skip area formed between the inventory region and the reproduction-only region.

In accordance with this aspect of the present invention, a cleaning disc cartridge for an information recording and reproducing system is provided. The cleaning disc cartridge includes a cartridge shell formed with a head insertion opening, a rotating disc rotatably received in the cartridge shell, and a cleaning member arranged on a surface of the rotating disc opposite to a head of the information recording and reproducing system. The cleaning member includes pile-like raised elements formed of fine fibers.

In a preferred embodiment of the present invention, the pile-like raised elements are formed of fibers of 1.5 deniers or less in size.

In a preferred embodiment of the present invention, the pile-like raised elements are formed of the fibers planted on a surface of a resin film applied to the surface of the rotating disc.

In a preferred embodiment of the present invention, the pile-like raised elements are formed of the fibers planted directly on the surface of the rotating disc.

In a preferred embodiment of the present invention, the cleaning member is formed with a thickness of 0.5 mm or less.

In a preferred embodiment of the present invention, the rotating disc includes a disc body which is formed thereon with an information region on which optical information or an optical signal is stored.

In a preferred embodiment of the present invention, the information region of the disc body includes an inventory region and an information recording and reproducing region.

In a preferred embodiment of the present invention, the cleaning member is arranged at least in the information recording and reproducing region on the surface of the disc body.

In accordance with this aspect of the present invention, a cleaning disc cartridge for an optical disc apparatus is provided. The cleaning disc cartridge includes a cartridge shell formed with a magnetic head insertion opening and an opening for an optical pickup, a rotating disc rotatably received in the cartridge shell, at least one first cleaning member arranged on one surface of the rotating disc opposite to an objective lens of the optical disc apparatus, and a second cleaning member arranged on the other surface of the rotating disc opposite to a magnetic head of the optical disc apparatus.

In a preferred embodiment of the present invention, the first cleaning member includes spun yarns formed of a plurality of fiber bundles each formed of a plurality of fine fibers by spinning and planted on the one surface of the rotating disc in a brush-like manner.

In a preferred embodiment of the present invention, the second cleaning member includes pile-like raised elements formed of fine fibers.

In a preferred embodiment of the present invention, the second cleaning member is formed with a thickness of 0.5 mm or less.

In a preferred embodiment of the present invention, the rotating disc includes a disc body which is formed thereon with an information region on which optical information or an optical signal is stored.

In a preferred embodiment of the present invention, the information region of the disc body includes an inventory region, a reproduction-only region defined on an outer peripheral side of the inventory region, and an information recording and reproducing region defined on an outer peripheral side of the reproduction-only region, wherein the first cleaning member is arranged at a region of the disc body defined outside the inventory region, at least a part of the reproduction-only region is positioned on an outside of the region of the disc body on which the first cleaning member is arranged, and the second cleaning member is arranged at least the information recording and reproducing region of the outer surface of the disc body.

In a preferred embodiment of the present invention, the region of the disc body on which the first cleaning member is arranged is a skip area formed in the reproduction-only region.

In a preferred embodiment of the present invention, the region of the disc body on which the first cleaning member is arranged is a skip area formed between the inventory region and the reproduction-only region.

In accordance with another aspect of the present invention, a casing is provided which is adapted to receive a disc cartridge including a cartridge shell and a rotating disc rotatably received in the cartridge shell and provided thereon with a center plate. The casing includes a casing body for receiving the disc cartridge therein, a cover mounted on the casing body for opening and closing the casing body, a plurality of support elements for holding the disc cartridge thereon which are arranged in a manner to be opposite to each other on the casing body, and a holder arranged on the casing body for abutteclly holding the center plate of the rotating disc thereon.

In a preferred embodiment of the present invention, the holder comprises an annular projection formed of an elastic material and projectedly mounted on a bottom of the casing body.

In a preferred embodiment of the present invention, the holder comprises a cylindrical projection formed of an elastic material and projectedly mounted on a bottom of the casing body.

In a preferred embodiment of the present invention, the rotating disc is provided with a cleaning member for cleaning an objective lens of the optical disc apparatus, wherein the holder is formed with a height which permits a gap substantially equal to a height of the cleaning member to be defined between the rotating disc and the cartridge shell.

BRIEF DESCRIPTION OF THE DRAWINGS

These and other objects and many of the attendant advantages of the present invention will be readily appreciated as the same becomes better understood by reference to the accompanying drawings; wherein:

FIG. 10(*b*) is a schematic view showing another example of a spinning structure of a spun yarn provided on the cleaning disc of FIG. 9;

FIG. 10(*c*) is a schematic view showing a further example of a spinning structure of a spun yarn provided on the cleaning disc of FIG. 9;

FIG. 11 is a schematic view showing a size of a bundle of fibers for forming a spun yarn;

DETAILED DESCRIPTION OF THE PREFERRED EMBODIMENTS

Figure 1:
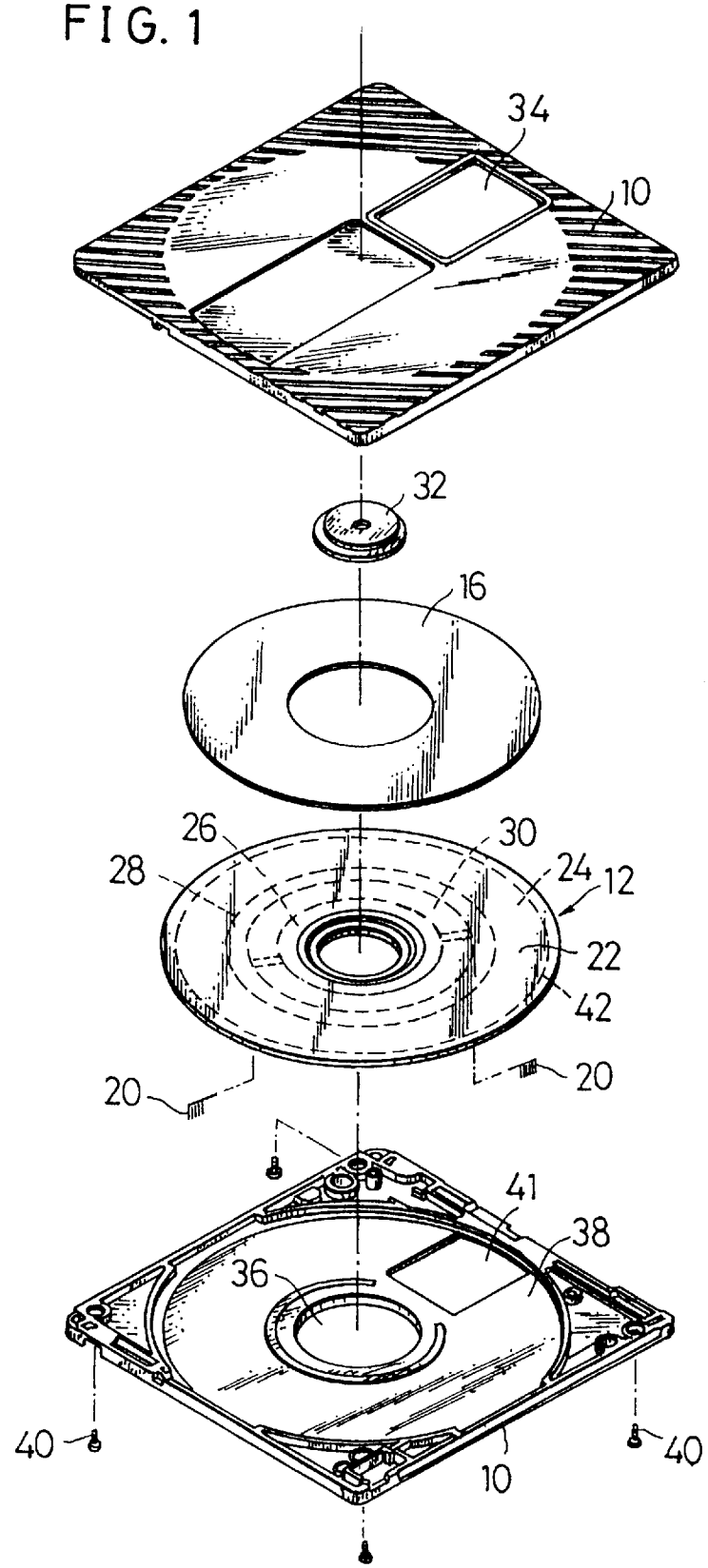
FIG. 1 is an exploded perspective view showing an embodiment of a cleaning disc cartridge according to the present invention.

Now, a cleaning disc cartridge according to the present invention will be described hereinafter with reference to FIGS. 1 to 23, wherein like reference numerals designate like or corresponding parts.

Referring first to FIGS. 1 to 4, a first embodiment of a cleaning disc cartridge according to the present invention is illustrated. A cleaning disc cartridge of the illustrated embodiment includes a cartridge shell 10, in which a rotating disc 12 is rotatably received. The rotating disc 12 is provided on one surface thereof opposite to a magnetic head 14 (FIG. 4) of an information recording and reproducing system such as a magneto-optical disc apparatus with a head cleaning member 16 of a disc-like shape, which may comprise an abrasive tape, fillings or the like. Also, the disc 12 is provided on the other surface thereof opposite to an objective lens 18 (FIG. 4) of the apparatus with at least one lens cleaning member 20, which may be in the form of a brush. In the illustrated embodiment, two such lens cleaning members or brushes 20 are arranged. Thus, the cleaning disc cartridge for a magneto-optical disc apparatus is provided.

The rotating disc 12 includes a disc body 22 is provided with an information recording and reproducing region 24, an inventory region 26 called a table of contents (TOC), and a reproduction-only region 28 exclusively used for reproduction of information. Each of the lens cleaning member or brush 20 described above is arranged on the reproduction-only region 28. More particularly, the inventory region 26 and the information recording and reproducing region 24 are defined on an inner peripheral region of the disc body 22 and an outer peripheral region thereof, respectively, between which the reproduction-only region 28 is defined.

Figure 5:
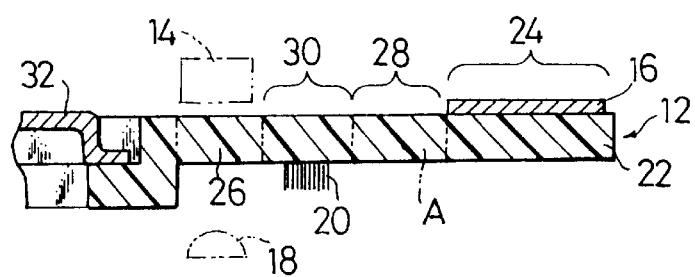
FIG. 5 is a fragmentary enlarged side elevation view in section showing a modification of the cleaning disc cartridge of FIG. 1.

In the illustrated embodiment, the lens cleaning members or brushes 20 are arranged at a skip area 30 formed in the reproduction-only region 28 defined between the information recording and reproducing region 24 and the inventory region 26. Thus, a lens cleaning member arrangement region or brush arrangement region is defined at a part of the reproduction-only region 28. Alternatively, the skip area 30 may be defined on an inside of the reproduction-only region 28 as shown in FIG. 5. In the illustrated embodiment, the head cleaning member 16 is arranged in only the information recording and reproducing region 24 on a side opposite to that on which the lens cleaning members or brushes 20 are positioned. Alternatively, it may be arranged so as to straddle the inventory region 26 writable, the reproduction-only region 28 to which the lens cleaning members are applied and/or the skip area 30, and the information recording and reproducing region 24.

Figure 4:
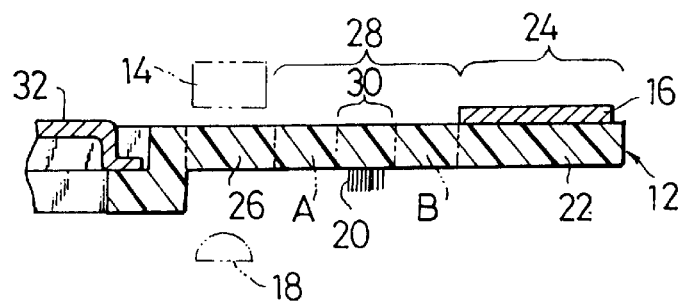
FIG. 4 is a fragmentary enlarged side elevation view in section of the cleaning disc cartridge shown in FIG. 1.

In the illustrated embodiment, as described above, the brush arrangement region is defined at a part of the reproduction-only region 28 as shown in FIG. 4. Thus, the disc body 22 is formed thereon with the inventory region 26, the reproduction-only region 28 which is charged with signals on first and second numbers A and B through the skip area 30, and the information recording and reproducing regions 24 in order from an inside thereof. The information recording and reproducing region 24 is provided with the head cleaning member 16 in a manner to be positioned on one side of the disc body and is provided with the lens cleaning members or brushes 20 in a manner to be positioned at the skip area 30 in the reproduction-only region 28 and on the other side of the disc body 22, so that the first and second numbers A and B may be reproduced.

Alternatively, as shown in FIG. 5, the skip area 30 may be arranged between the inventory region 26 and the reproduction-only region 28 and the brushes 20 may be provided on the skip area 30. Thus, the lens cleaning members or brushes 20 are positioned between the inventory region 26 and the reproduction-only region 28 on an inside of the information recording and reproducing region 24.

The rotating disc 12 is provided at a central portion thereof with a center plate 32. The information recording and reproducing region 24 is formed with a track or a pit in a spiral or concentric manner about the center plate 32 on which optical information or an optical signal is stored at predetermined intervals. The information may include information on music or display information on cleaning such as start of cleaning, end thereof or the like. The information recording and reproducing region 24 is defined at a portion of the rotating disc 12 which is exposed through a window or opening 34 formed at the cartridge shell 10.

The head cleaning member 16 may comprise a nonwoven fabric material or fillings formed of a fiber material such as nylon, rayon or the like. Alternatively, it may comprise an abrasive sheet such as, for example, a sheet having an abrasive material such as fine particles of chromium oxide, aluminum oxide, silicon oxide or the like applied thereto. The head cleaning member 16 thus formed is adhered through an adhesive tape to the one surface of the rotating disc 12 over an area larger than an area of sliding of the head. The cleaning member 16 may be formed into any suitable shape other than a disc-like shape. It may be formed on a part of the one surface of the disc 12. Also, it may be impregnated or coated with a cleaning liquid for improving a cleaning function.

The head cleaning member 16 may be formed with a thickness of 0.5 mm or less, to thereby permit information to be written on a portion of the one surface of the disc body 22 positioned under a lower surface of the cleaning member 16. For example, this permits information on a region of the cleaning member 16 which has been used for cleaning to be written thereon. This results in eliminating a necessity of arranging the information recording and reproducing region 24 at a portion of the disc body 22 apart from the cleaning member 16.

The inventory region 26 of the disc body 22 of the disc 12 is charged with information for indicating a range of each of the reproduction-only region 28 and the information recording and reproducing region 24, and the brushes 20 are applied to the reproduction-only region 28 between the inventory region 26 and the information recording and reproducing region 24 or to the skip area 30. The brush 20 may be formed of a nylon fiber, a carbon fiber, a glass fiber, an aramid fiber or the like. Application of the brushes 20 to the disc body 22 may be conveniently carried out using an adhesive or a double-coated adhesive tape at grooves or apertures formed on the disc body 22.

The brushes 20 each may be arranged on a portion of the rotating disc 12 defined in a radial direction thereof and include fillings arranged so as to vertically extend. In the present invention, it is merely required that the brushes each are mounted on the disc body 22 so that the fillings are arranged oppositely to the objective lens 18 and in a manner to extend in a direction of contact with the objective lens 18.

Figure 2:
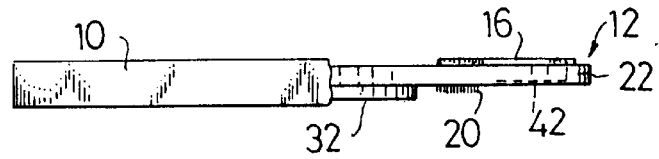
FIG. 2 is a partly cutaway side elevation view of the cleaning disc cartridge shown in FIG. 1.
Figure 3:
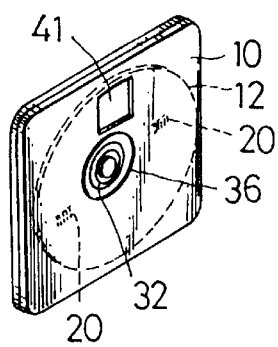
FIG. 3 is a perspective view of the cleaning disc cartridge shown in FIG. 1.

In FIGS. 1 and 2, reference numeral 36 designates an aperture of the cartridge shell 10 through which a drive shaft of the magneto-optical disc apparatus is inserted, 38 is a disc receiving space defined in the cartridge shell 10, 40 is connection screws for integrally forming the cartridge shell 10, and 41 is an opening through which an optical pickup of the apparatus is inserted.

As can be seen from the foregoing, the cleaning disc cartridge of the illustrated embodiment is so constructed that the lens cleaning members or brushes 20 for cleaning the objective lens 18 are arranged on the one surface of the rotating disc 12 opposite to the objective lens 18 and the head cleaning member 16 for cleaning the magnetic head 14 is arranged on the other surface of the rotating disc 12 opposite to the magnetic head 14, wherein the disc body 22 has the inventory region 26 defined on the inner peripheral side of the lens cleaning member arrangement region thereof, the reproduction-only region 28 defined on the outer peripheral side of the lens cleaning member arrangement region, and the information recording and reproducing region 24 defined outside the reproduction-only region 28. Such construction facilitates handling and operation of the cleaning disc cartridge and permits the magnetic head and objective lens to be concurrently cleaned with high efficiency and without causing any error in reading of a signal or information. Also, the above-described constriction permits the cleaning disc cartridge of the illustrated embodiment to be applicable to both a recording and reproducing apparatus including both an objective lens and a magnetic head and a reproduction-only apparatus including only an objective lens.

Figure 6:
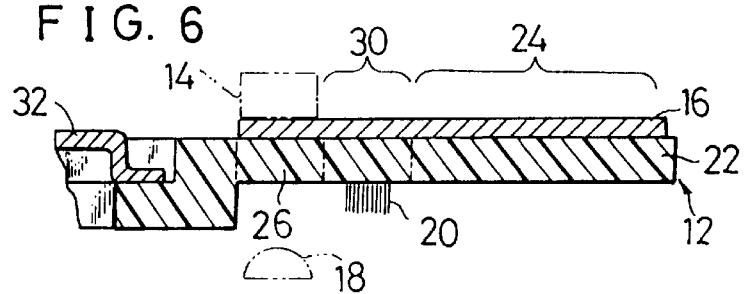
FIG. 6 is a fragmentary enlarged side elevation view in section showing a second embodiment of a cleaning disc cartridge according to the present invention.

Referring now to FIG. 6, another or a second embodiment of a cleaning disc cartridge according the present invention is illustrated. A cleaning disc cartridge of the illustrated embodiment is constructed in such a manner that a disc body 22 of a rotating disc 12 which may be a magneto-optical disc is provided thereon with an information recording and reproducing region 24 and an inventory region 26 in a manner to be spaced from each other at a predetermined interval as in the above-described first embodiment. Also, the rotating disc 12 is provided on a portion of one surface thereof between the region 24 and 26 with lens cleaning members 20 each of which may comprise a brush. A head cleaning member 16 may be conveniently arranged in a manner to straddle the inventory region 26 writable, a skip area 30 of a lens cleaning member arrangement region and the information recording and reproducing region 24 on the other surface of the rotating disc 12 opposite to the one surface thereof on which the lens cleaning members are provided.

The inventory region 26 of the disc body 22 of the cleaning disc or magneto-optical disc 12 is charged with information indicating that the information recording and reproducing region 24 initiates at an outer periphery of the brush mounting portion of the disc body 22. Also, the skip area 30 defined between the inventory region 26 and the information recording and reproducing region 24 is mounted with the brushes.

The remaining part of the illustrated embodiment may be constructed in substantially the same manner as the first embodiment described above.

As described above, the cleaning disc cartridge of the second embodiment is so constructed that the disc body 22 is provided on the portion thereof except the information recording and reproducing region 24 and inventory region 26 with the lens cleaning members 20, thus, it will be noted that the illustrated embodiment exhibits substantially the same advantages as the first embodiment described above.

Figure 7:
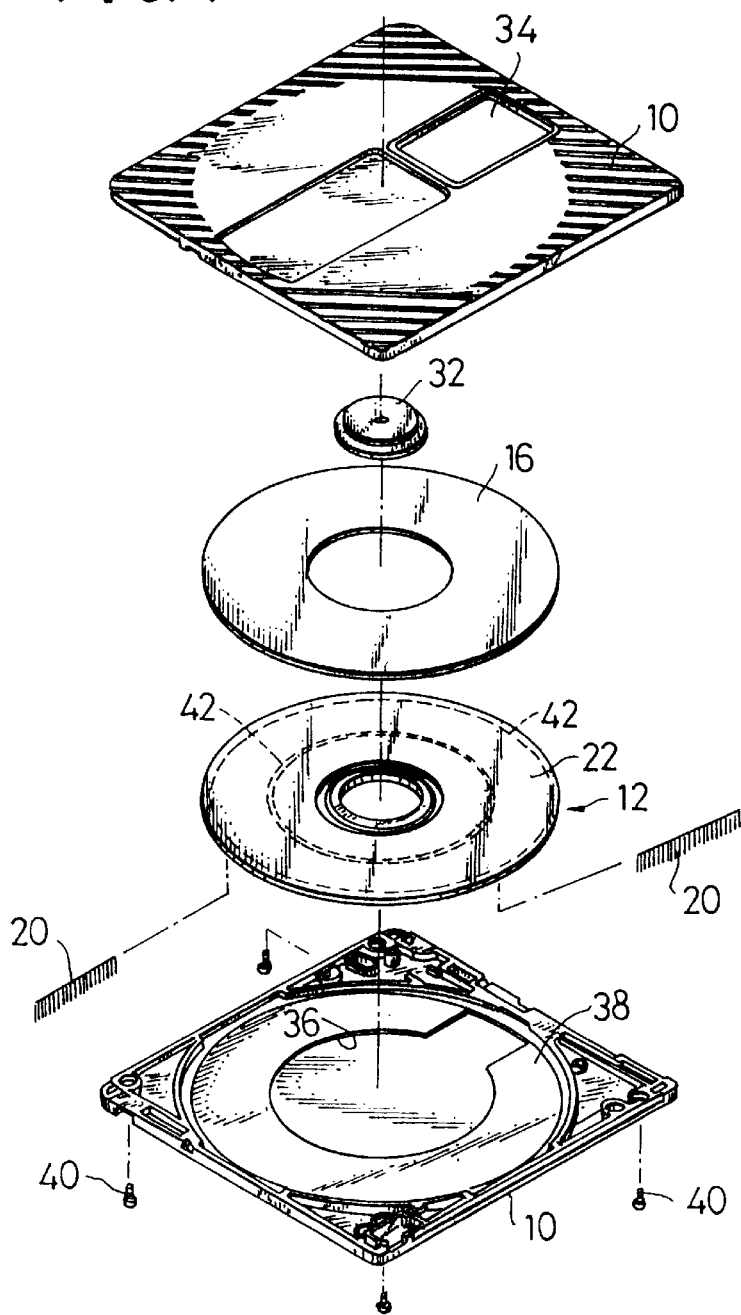
FIG. 7 is an exploded perspective view showing a third embodiment of a cleaning disc cartridge according to the present invention.
Figure 8:
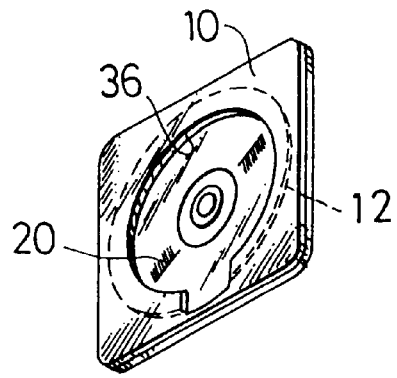
FIG. 8 is a perspective view of the cleaning disc cartridge shown in FIG. 7.

Referring now to FIGS. 7 and 8, a further or third embodiment of a cleaning disc cartridge according to the present invention is illustrated. A cleaning disc cartridge of the third embodiment includes a cartridge shell 10 and a rotating disc 12 rotatably received in the cartridge shell 10. The rotating disc 12 is provided on one surface thereof with a disc-like head cleaning member 16 for cleaning a magnetic head and on the other surface thereof with at least one or two lens cleaning member or brush 20 for cleaning an optical lens.

The rotating disc 12 includes a disc body 22 and a center plate 32 provided at a central portion of the disc body 22. The disc body 22 is provided thereon with an information region 42, which is formed with a track or a pit in a spiral or concentric manner about the center plate 32 on which optical information or an optical signal is stored at predetermined intervals. The information may include information on music or display information on cleaning such as start of cleaning, end thereof or the like. The information region 42 is provided at a portion of the disc body 22 which is exposed through a window 34 or an aperture 36 each formed at the cartridge shell 10.

The head cleaning member 16 may comprise a sheet made of a nonwoven fabric material, a sheet provided thereon with fillings or an abrasive sheet. The abrasive sheet may comprise a sheet to which fine particles of an abrasive material such as chromium oxide, aluminum oxide, silicon oxide or the like are applied. The head cleaning member 16 thus formed may be adhered to the one surface of the rotating disc 12 by means of an adhesive tape. The remaining part of the illustrated embodiment may be constructed in substantially the same manner as the first or second embodiment described above.

Thus, it will be noted that the illustrated embodiment may exhibit substantially the same advantages as the first embodiment described above.

Figure 9:
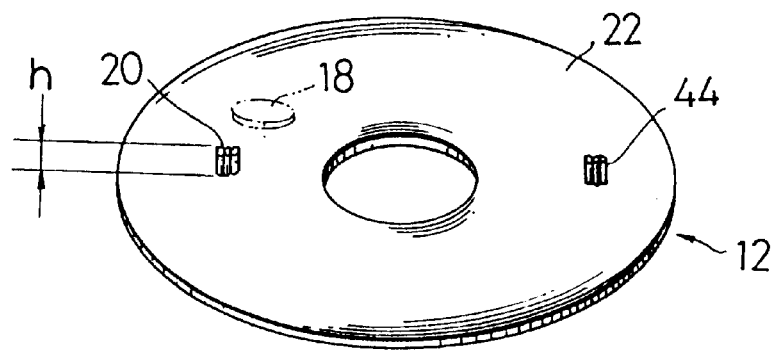
FIG. 9 is a perspective view showing a cleaning disc incorporated in a fourth embodiment of a cleaning disc cartridge according to the present invention.

Referring now to FIGS. 9 to 12, still another or a fourth embodiment of a cleaning disc cartridge according to the present invention is illustrated. FIG. 9 shows a rotating disc or cleaning disc 12 incorporated in a cleaning disc cartridge of the illustrated embodiment, which includes a disc body 22 formed of polycarbonate resin or the like into a disc-like shape. The disc body 22 is formed on a surface thereof opposite to an optical lens or pickup lens 18 of an optical information recording and reproducing apparatus with an inventory region and an information recording and reproducing region. Also, the disc body 22 is provided on the surface thereof with at least one or two lens cleaning members 20 for cleaning the optical lens 18 and a portion of the surface of the disc body 22 on which the lens cleaning members 16 are provided is defined to be a skip region.

The lens cleaning member 16 may be made of spun yarns 44 formed by spinning fine fibers such as rayon, nylon, polyester or the like. More particularly, it may be formed by planting or setting the spun yarns 44 on the surface of the disc body 22 in a brush-like manner. The fine fibers each are desirably have a size of 0.1 to 0.5 denier. The spun yarn may be made by spinning a plurality of fiber bundles each formed of a plurality of fibers into a suitable or predetermined thickness or diameter. A thickness of each of the spun yarns and the number of fiber bundles for each spun yarn are determined depending on an information recording and reproducing apparatus to which the cleaning disc cartridge of the embodiment is to be applied. This is likewise true of the number of spun yarns to be set on the surface of the disc body 12.

Figure 10A:
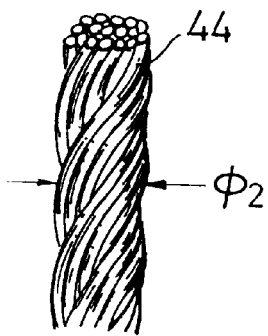
FIG. 10(*a*) is a schematic view showing an example of a spinning structure of a spun yarn provided on the cleaning disc of FIG. 9.

The spun yarn may be formed into such a spiral configuration or structure as shown in FIG. 10(a). Such a spiral structure permits the spun yarn to exhibit an excellent restoring property, because each of threads of the spun yarn exhibits a spring action in a longitudinal direction thereof. Alternatively, the spun yarn may be formed into such a flat or plain structure as shown in FIG. 10(b) or such a tubular or code structure as shown in FIG. 10(c).

The spun yarns 44 thus formed are then provided or mounted on a rotating disc 12 such as a down-sized magneto-optical disc. For this purpose, each of the fiber bundles is formed of a plurality of fibers into a size $\phi_1$ of 100 deniers as shown in FIG. 11. Then, about three or more such fiber bundles are spun to form the spun yarn of 250 to 290 deniers in size $\phi_2$ as shown in FIG. 10(a). Then, about three such spun yarns are arranged on the surface of the disc body 22 to form fillings while keeping a length h of the fillings at about 2 mm, as shown in FIG. 9. In general, a length of the fillings-may-be set to be larger by about 0.3 to 1.5 mm and preferably 0.5 to 1.0 mm than a gap defined between the objective lens 18 and the rotating disc 12. The cleaning member 20 thus constructed provides contact frictional force of a suitable level between the cleaning member and the pickup lens 18 and exhibits satisfactory restoring force sufficient to provide durability over a long period of time.

Planting of the spun yarns 44 on the disc body 22 may be carried out by means of small though-holes of a diameter as small as about 0.5 mm formed via the skip region of the disc body 22. More particularly, the spun yarns each are inserted via each of the though-holes to cause one end thereof to be outwardly projected from the other surface of the disc body 22. Then, the one end of each of the spun yarns 44 is bent on the other surface of the disc body 22 and fixed thereon by means of an adhesive tape. The skip region on which the spun yarns 44 are set may be defined between the inventory region and a reproduction-only region.

Figure 12:
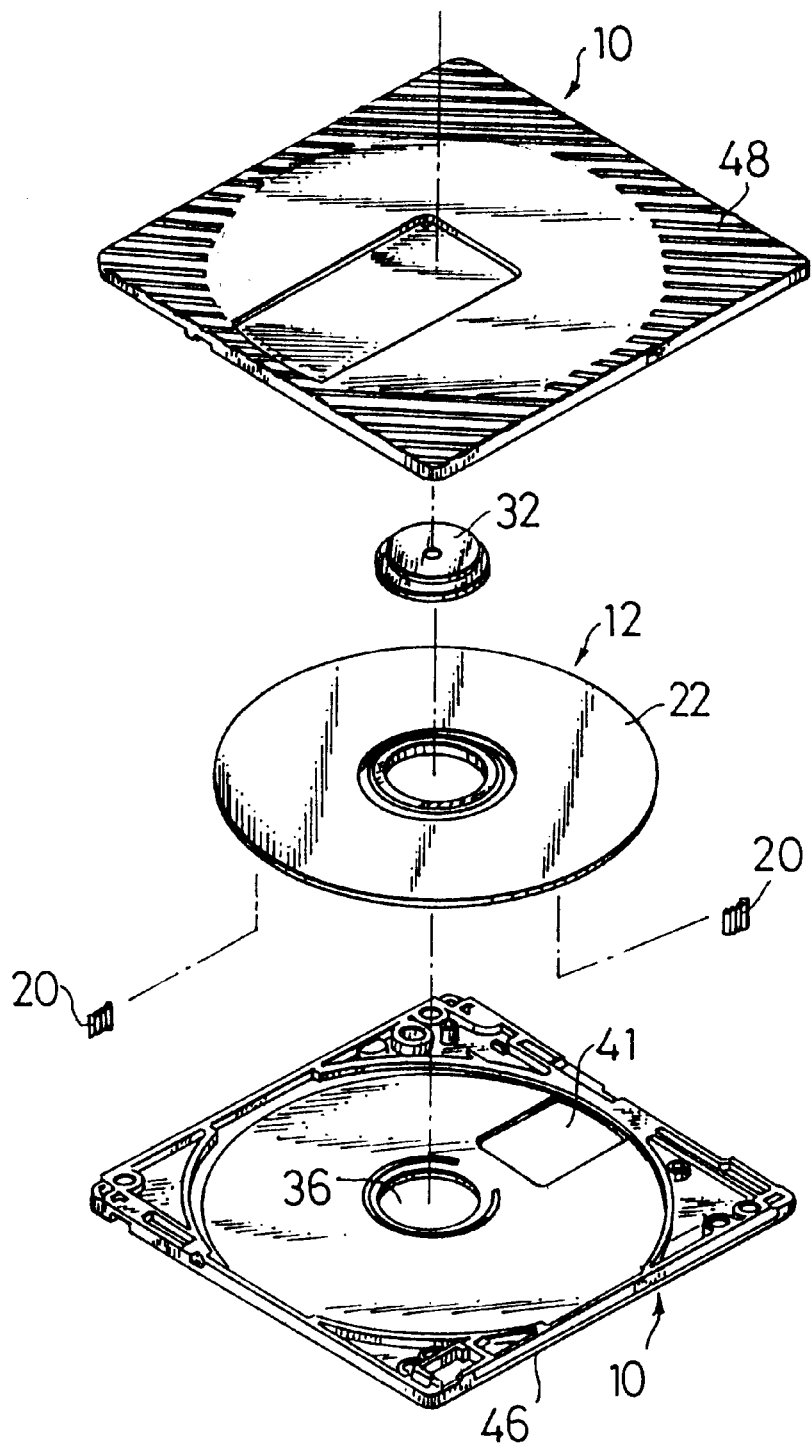
FIG. 12 is an exploded perspective view showing a cleaning disc cartridge having the cleaning disc of FIG. 9 incorporated therein.

The cleaning disc or rotating disc 12, as shown in FIG. 12, is rotatably received in a cartridge shell 10, which may be constructed of a shell body 46 and a shell cover 48 mounted on the shell body 46. The cleaning disc 12 includes a center plate 32 arranged at a central portion of one surface of the disc body 22 and provided on the other surface thereof with the lens cleaning members 20. The shell body 46 is formed with an opening 41 through which the lens cleaning members 20 each are slidly contacted with the optical lens or pickup lens 18. The shell body 46 and cover 48 are integrally joined to each other by ultrasonic welding, to thereby provide the cartridge shell 10.

Now, the manner of operation of the cleaning disc cartridge of the illustrated embodiment constructed as described above will be described hereinafter.

The lens cleaning members 20 each are contacted with the pickup lens 18 every time when it is aligned with the pickup lens 18 during operation of the cleaning disc cartridge, so that any foreign matter and/or pollutant adhered to the lens may be effectively removed. The lens cleaning members 20 each are formed of the spun yarns 44 made of fine and flexible fibers such as rayon, nylon, polyester or the like, to thereby be softly contacted with the lens, resulting in accomplishing cleaning of the lens without any damage to the lens. Also, the spun yarn 44 for the lens cleaning member exhibits satisfactory restoring force because of being formed of a plurality of fiber bundles by spinning, to thereby prevent the lens cleaning member from falling or deformed into a trumpet-like configuration, leading to an improvement in durability.

The inventors made an experiment on a spinning brush of the present invention and a conventional fiber-bundle brush each formed of polyester fibers and mounted on a surface of a cleaning disc, wherein an angle of falling or inclination of fillings of each of the brushes depending on the number of times of cleaning operation was measured. Each of spun yarns for the present brush was formed with a thickness of 0.5 mm and each of the fiber bundles for the conventional brush was formed with a width of 1 mm. The fillings of both brushes were formed with a length of 2 mm. Results of the test were as shown in table 1.

TABLE 1

| Load Conditions | Angle of Inclination (Degrees) | |
|---|---|---|
| (Cleaning Operation) | Present Brush | Conventional Brush |
| No load | 0 | 0 |
| 10 times | 10 | 15 |
| 50 times | 18 | 28 |
| 100 times | 22 | 35 |

Table 1 indicates that there is a remarkable difference between the present brush and the conventional one, therefore, it is considered that the present brush is clearly superior in cleaning performance and durability to the conventional one.

In the illustrated embodiment described above, only the lens cleaning members 20 are arranged on the rotating disc 12. The cleaning disc cartridge of the embodiment may further include a head cleaning means which may be provided on a surface of the disc 12 opposite to the surface thereof on which the lens cleaning members 20 are arranged. This permits the cartridge to be applicable to both an information recording and reproducing apparatus and a reproduction-only apparatus. Also, such arrangement of the head cleaning means permits the disc 12 to be provided on a lower surface thereof with writable and/or readable regions such as an inventory region including an inner and outer sections, an inventory region for a user, an information recording and reproducing region and the like, so that the cleaning disc cartridge may meet specifications on an optical disc and a magneto-optical disc. When the head cleaning means is arranged on the disc, the shell cover 48 is formed with a window or an opening through which the cleaning means is slidly contacted with a magnetic head of the apparatus, a head holder thereof or the like.

The remaining part of the illustrated embodiment may be constructed in substantially the same manner as any one of the above-described embodiments.

As can be seen from the foregoing, in the illustrated embodiment, the lens cleaning members each are formed of the spun yarns exhibiting excellent restoring force into a brush-like configuration, to thereby prevent falling thereof and deformation of the members into a trumpet-like shape, resulting in being highly improved in durability. Also, this effectively prevents abnormal judgment a failure in skip operation due to the leans cleaning member.

Figure 13:
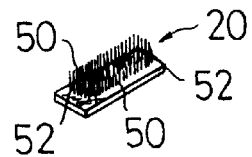
FIG. 13 is a perspective view showing a brush acting as a lens cleaning member in a fifth embodiment of a cleaning disc cartridge according to the present invention.
Figure 14:
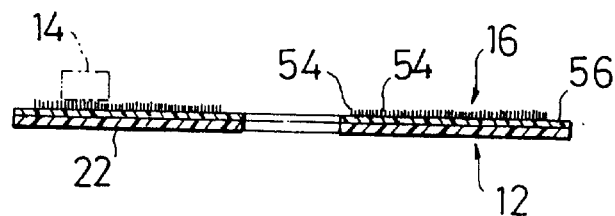
FIG. 14 is a sectional view showing a rotating or cleaning disc incorporated in a sixth embodiment of a cleaning disc cartridge according to the present invention.

FIG. 13 shows each of lens cleaning members which may be incorporated in yet another or a fifth embodiment of a cleaning disc cartridge according to the present invention. The lens cleaning member in the form of a brush generally indicated at reference numeral 20 in FIG. 13 includes high-modulus fiber elements 50 made of a fiber material increased in elastic restoring force such as carbon fiber, glass fiber, aramid fiber, a combination thereof or the like and, as required, hygroscopic fiber elements 52 made of a fiber material increased in hygroscopicity such as nylon fiber, rayon fiber or the like. The brush 20 thus constructed exhibits satisfactory resistance to deformation, to thereby provide the cleaning disc cartridge with high durability.

The brush 20 may be so constructed that the high-modulus fiber elements 50 and hygroscopic fiber elements 52 are alternated with each other. Alternatively, the hygroscopic fiber elements 52 are arranged inside and the high-modulus fiber elements 50 may be arranged outside the elements 50, resulting in forming a sandwich structure.

The thus-formed brush 20 is arranged on a surface of a rotating disc in a manner to occupy a part of the rotating disc defined in a radial direction thereof and so that the fiber elements or fillings thereof extend in a direction perpendicular to the surface of the disc. Thus, the brush 20 is fixed on a surface of the rotating disc opposite to an optical or objective lens so that the fiber elements extend in a direction perpendicular to the surface.

The remaining part of the fifth embodiment may be constructed in substantially the same manner as the above-described embodiments.

Thus, in the cleaning disc cartridge of the illustrated embodiment, the lens cleaning members each are formed of high-modulus fiber elements or fillings made of at least one selected from the groups consisting of carbon fiber, glass fiber and aramid fiber, resulting in exhibiting satisfactory resistance to deformation without deteriorating its cleaning function. Also, the lens cleaning member may include the hygroscopic fiber elements in addition to the high-modulus fiber elements, resulting in effectively removing dews adhered to the lens.

Referring now to FIGS. 14 to 17, a still further or sixth embodiment of a cleaning disc cartridge according to the present invention is illustrated. A cleaning disc cartridge of the illustrated embodiment includes a rotating disc or cleaning disc 12 including a disc body 22 and a head cleaning member 16 provided on a surface of the disc body 22 opposite to a magnetic head 14 of an information recording and reproducing apparatus.

The head cleaning member 16 includes raised elements formed by planting fine chemical fibers 54 such as rayon, nylon, polyester or the like in a pile-like manner on the surface of the disc body 22. The chemical fibers 54 are relatively flexible and has hygroscopicity and the raised elements formed of the chemical fibers 54 are formed in a hairiness-like manner or in a loop-like and hairiness-like manner while keeping an end of each of the chemical fibers 54 positioned on a surface side thereof, resulting in providing the cleaning member 16 with a uniform surface.

The pile-like raised elements are formed by planting or setting the fine chemical fibers 54 on a resin film 56 such as polyester or the like on a surface of the disc body 22. Alternatively, the fibers 54 may be planted directly on the disc body 22. The planting may be carried out by electrostatic flocking or by cutting the chemical fibers into a predetermined length, subjecting a surface of the resin film applied to the disc body 22 or a surface of the disc body 22 to a primer treatment, applying an adhesive such as a water soluble adhesive or a solvent two-pack adhesive to the surface thus primer-treated, and applying a voltage as high as 30,000 V to the fibers, leading to adhesion of the fibers by scattering. After the planting, water of the adhesive or the solvent is removed by drying in a dry oven.

For arrangement of the cleaning member 16 on a magneto-optical disc, the raised elements are conveniently formed so as to have fiber dimensions of 1.5 deniers or less in size, 0.3 mm or less in length, and 0.4 mm or less in thickness. Such dimensions permits frictional resistance of the head cleaning member to the magnetic head 14 and a head holder to be significantly reduced and permits the head cleaning member to exhibit an appropriate cleaning function in view of a clearance between a cartridge shell 10 and the disc 12 and an interval between the disc and the magnetic head 14 or head holder. Dimensions exceeding the above-described ones cause an increase in contact area between the magnetic head 14 or head holder and the head cleaning member 16, leading to an increase in frictional resistance, resulting in load applied to a disc drive motor of an information recording and reproducing apparatus being increased.

Figure 15:
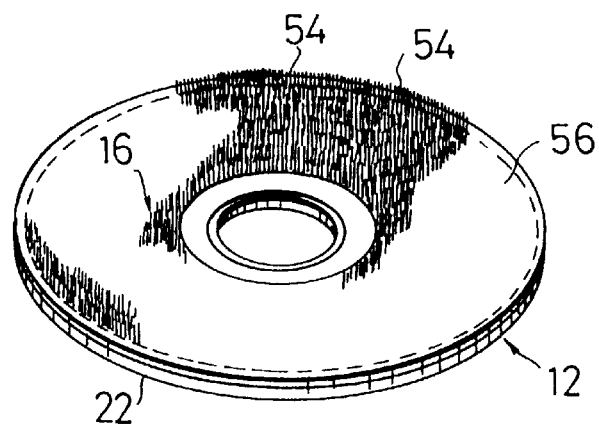
FIG. 15 is a perspective view of the cleaning disc shown in FIG. 14.

The pile-like raised elements formed of the fibers 54 may be arranged on a portion of the surface of the disc body 22 corresponding to a range of operation of the magnetic head 14, namely, the whole surface of the disc body including an inventory region having inner and outer sections, an inventory region for a user, an information recording and reproducing region and the like or a part thereof. In FIG. 15, the cleaning disc 16 has the raised elements arranged over the whole surface of the disc body 22. The resin film 56 on which the fine fibers are thus planted to form the raised elements of the head cleaning member 16 is applied to a predetermined region of the disc body 22 by means of an adhesive or by ultrasonic bonding.

The disc body 22 of the cleaning disc 12 may comprise a disc provided with an information writable and/or readable region defined thereon so as to meet predetermined specifications. The information writable and/or readable region may be formed on a portion of a surface of the disc body 22 positioned under the head cleaning member 16 provided with the pile-like raised elements. The pile-like raised elements are formed with a thickness of 0.4 mm or less, so that information indicating a portion of the cleaning disc which has been used or consumed for cleaning the head 14 or the like may be stored on the disc body 22.

Figure 16:
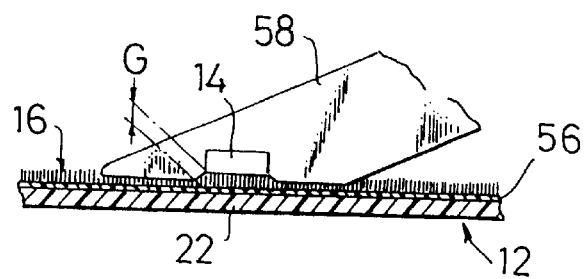
FIG. 16 is a fragmentary schematic view of the cleaning disc shown in FIG. 14 which is used as a magneto-optical disc.
Figure 17:
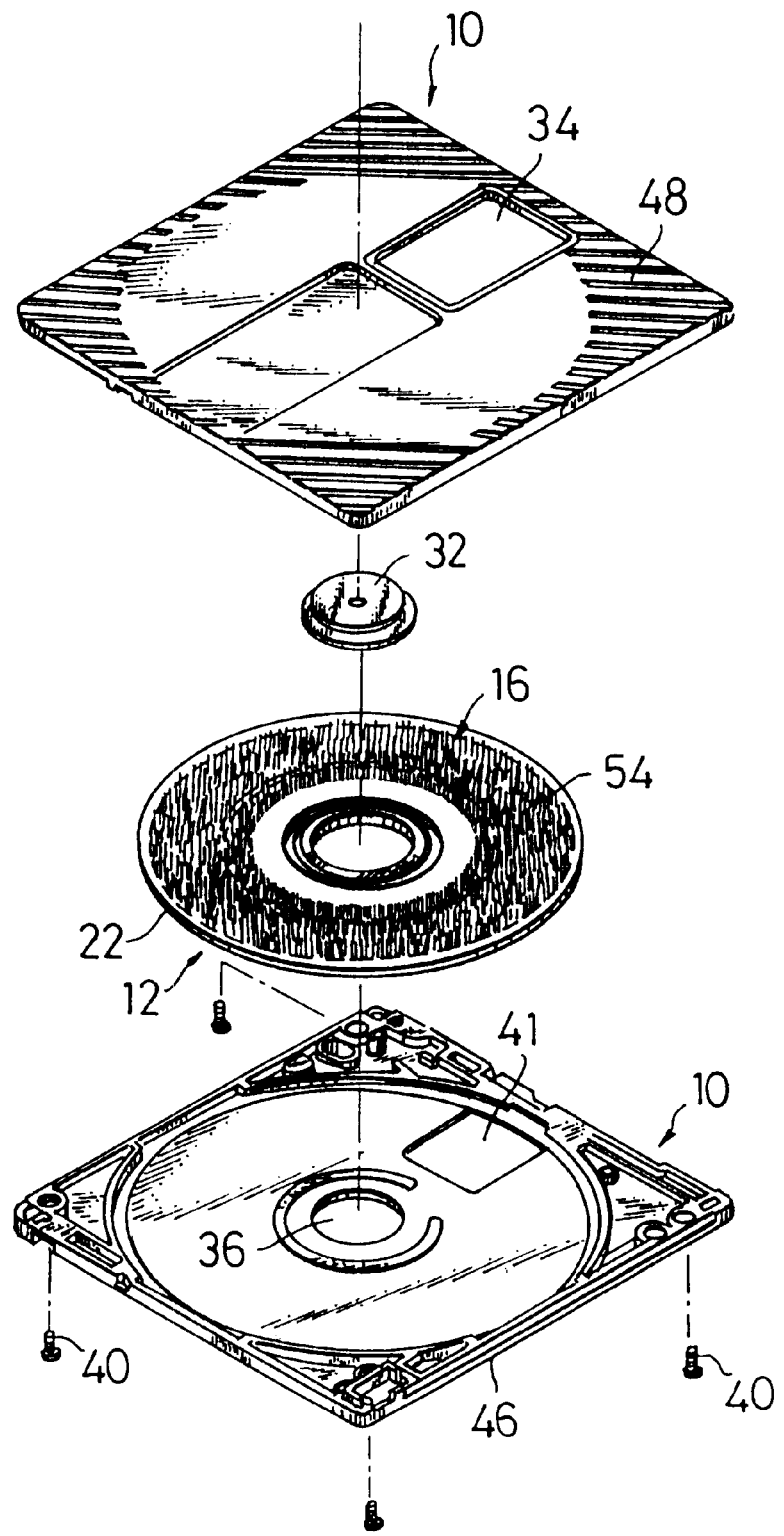
FIG. 17 is an exploded perspective view showing a cleaning disc cartridge having the cleaning disc of FIG. 14 incorporated therein.

When the cleaning disc 12 constructed as described above is used as a magneto-optical disc in the illustrated embodiment as shown in FIG. 16, a recording system is employed which is executed under the conditions that the magnetic head 14 is kept spaced at a gap G from the surface of the disc 12 without being contacted with the surface and alternatively a head-holder 58 is kept contacted with the surface of the disc. In this instance, the magnetic head 14 and head holder 58 are kept contacted with the pile-like raised elements of the head cleaning member 16, resulting in any foreign matter or pollutant adhered to the head being effectively removed therefrom.

During the cleaning, the raised elements of the head cleaning member 16 are kept softly contacted with the head holder 58 and magnetic head 14 without abrading the head holder 58 while ensuring appropriate frictional resistance therebetween, to thereby positively remove any foreign matter oil a flat portion of a surface of the head, as well as that on an uneven portion of the surface. Also, the cleaning disc reduces load applied to a disc drive motor of a disc player and prevents the adhesive of the raised elements formed in a pile-like shape by electrostatic flocking from adhering to the head holder 58 and magnetic head 14.

The remaining part of the illustrated embodiment may be constructed in substantially the same manner as any one of the above-described embodiments.

Figure 18:
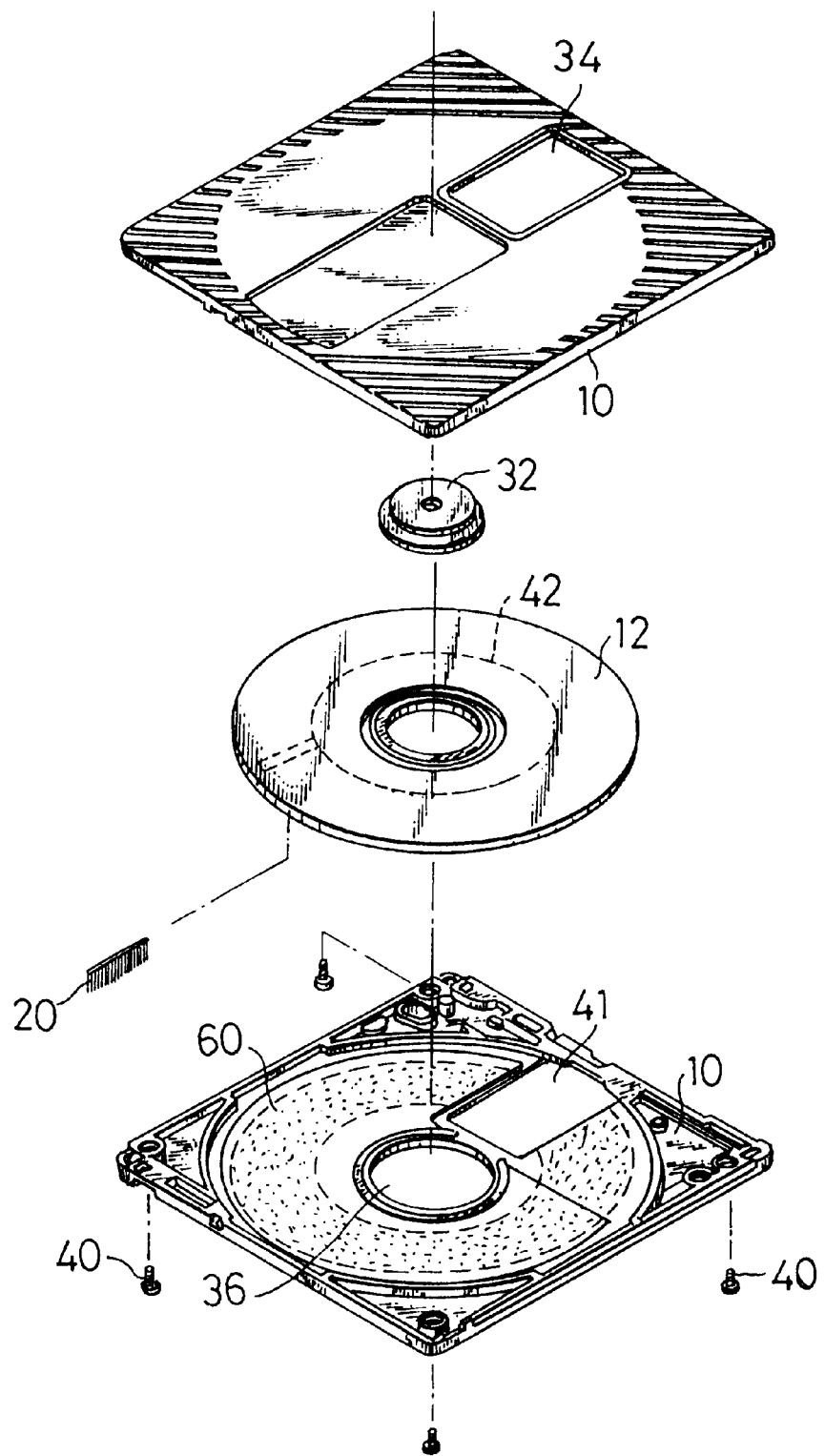
FIG. 18 is an exploded perspective view showing a seventh embodiment of a cleaning disc cartridge according to the present invention.

Referring now to FIG. 18, a seventh embodiment of a cleaning disc cartridge according to the present invention is illustrated.

A cleaning disc cartridge of the illustrated embodiment includes a cartridge shell 10 and a rotating disc 12 rotatably received in the cartridge shell 10. The rotating disc 12 is provided on a surface thereof opposite to an optical lens of a disc player with a lens cleaning member or brush 20. The lens cleaning member 20 includes high-modulus fiber elements made of a fiber material increased in elastic restoring force such as carbon fiber, glass fiber, aramid fiber, a combination thereof or the like and, as required, hygroscopic fiber elements made of a fiber material increased in hygroscopicity such as nylon fiber, rayon fiber or the like, as in the embodiment shown in FIG. 13. An inner surface 60 of the cartridge shell 10 which is opposite to the brush 20 and contacted therewith is provided with resistance to abrasion.

The brush 20 may be so constructed that the high-modulus fiber elements and hygroscopic fiber elements are alternated with each other. Alternatively, it may be so constructed that the high-modulus fiber elements are arranged inside and the hygroscopic fiber elements are arranged outside the high-modulus fiber elements, resulting in forming a sandwich structure.

The thus-formed brush 20 is arranged on the surface of the rotating disc 12 in a manner to occupy a part of the rotating disc defined in a radial direction thereof and so that the fiber elements or fillings thereof extend in a direction perpendicular to the surface of the disc. Thus, the brush 20 is fixed on the surface of the rotating disc opposite to the optical or objective lens so that the fiber elements extend perpendicularly to the surface.

The abrasion resistant surface 60 of the cartridge shell 10 may be formed by a plasma treatment. Alternatively, it may be formed by application of glass such as, for example, a mixture of glass fiber and glass powder thereto. The surface 60 may be subjected to an antistatic treatment.

Figure 19:
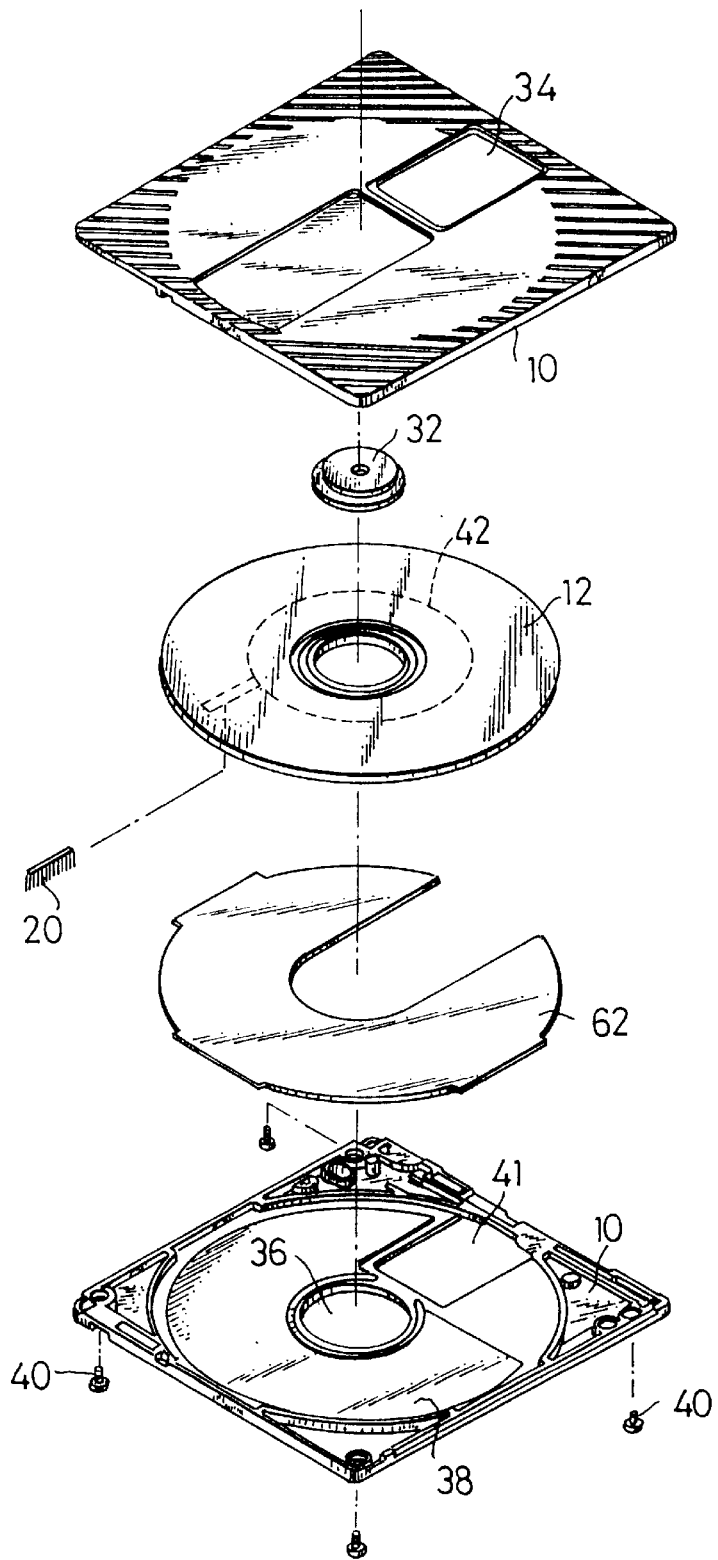
FIG. 19 is an exploded perspective view showing a modification of the cleaning disc cartridge shown in FIG. 18.

FIG. 19 shows a modification of the cleaning disc cartridge shown in FIG. 18, which is so constructed that a lubricous sheet is arranged between a surface of a rotating disc 12 on which a brush 20 is provided and an inner surface of a cartridge shell 10 contacted with the brush, to thereby provide the inner surface of the cartridge shell 10 with resistance to abrasion. The lubricous sheet 62 may be formed of a lubricous material such as polyethylene terephthalate or the like. The lubricous sheet 62 may be subjected to an antistatic treatment. Arrangement of the lubricous sheet 62 prevents deformation of the brush to permit it to exhibit a satisfactory cleaning function and prevents occurrence of any error in reading of a signal by an optical lens. The lubricous sheet 62 may be arranged in a disc receiving section 38 of the cartridge shell 10 or fixed on the shell 10 by means of an adhesive or a double-coated tape. The remaining part of the illustrated embodiment may be constructed in substantially the same manner as any one of the above-described embodiments.

As described above, the cleaning disc cartridge of the illustrated embodiment is so constructed that the cartridge shell 10 is provided on the surface thereof opposite to the lens cleaning member or brush 20 with resistance to abrasion. Such construction minimizes deformation of the brush to ensure durability thereof. Also, it effectively prevents production of dust such as white powder due to abrasion of the cartridge shell by the brush even when the brush is made of a high-modulus fiber material.

Figure 20:
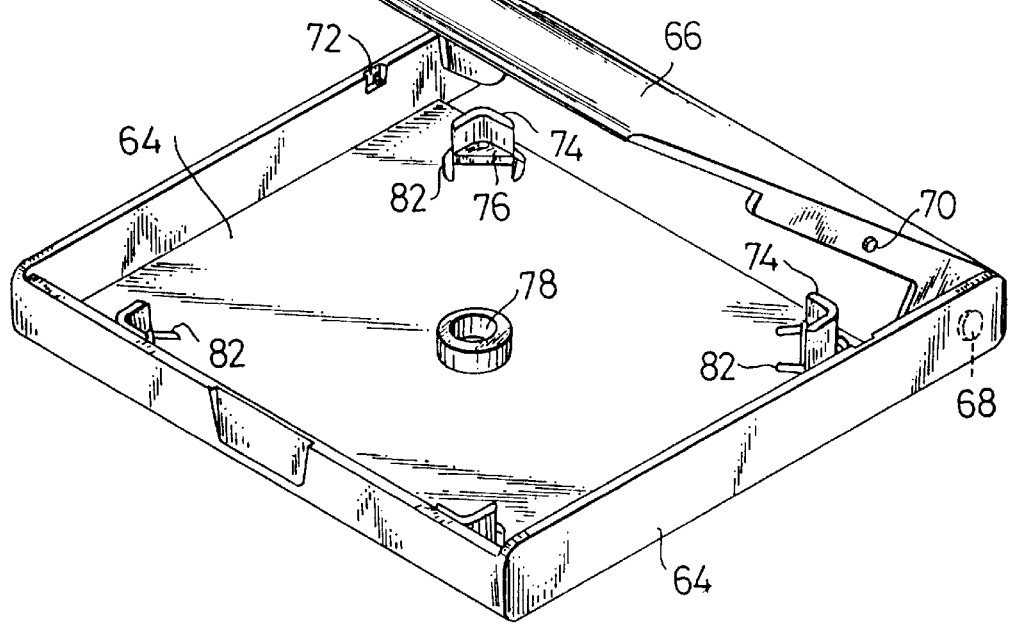
FIG. 20 is a perspective view showing a casing for a cleaning disc cartridge according to the present invention.
Figure 21:
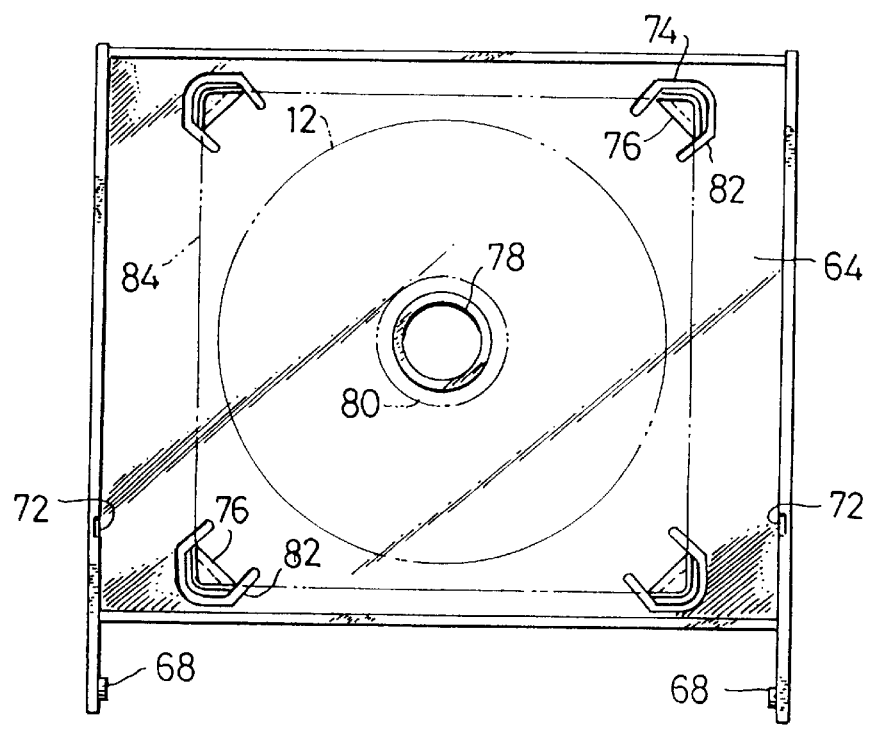
FIG. 21 is a plan view showing a casing body of the casing of FIG. 20.
Figure 22:
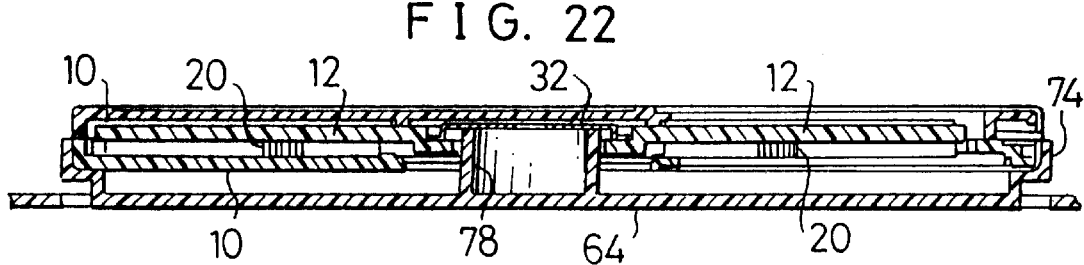
FIG. 22 is a vertical sectional view of the casing shown in FIG. 20 in which a cleaning disc is received.

Referring now to FIGS. 20 to 22, an embodiment of a casing for a cleaning disc cartridge according to the present invention is illustrated. A casing of the illustrated embodiment includes a casing body 64 for receiving a cleaning disc cartridge and therefore a cartridge shell 10 and a casing cover 66 openably or pivotally connected to the casing body 64 through support pins 68. The casing body 64 and cover 66 are provided with projection-like engagements 70 and recess-like engagements 72, respectively, which are adapted to be engaged with each other to hold the cover 66 on the casing body 64 when the cover 66 is closed. The engagements 70 and 72 are arranged on side walls of the body 64 and cover 66 opposite to each other. The casing body 64 is provided therein with a plurality of support elements 74 for holding the cartridge shell 10 thereon in a manner to be opposite to each other. The support elements 74 thus arranged in a manner to be opposite to each other on a bottom of the casing body 64 each are provided with a shell receiver 76. Also, the bottom of the casing body 64 is provided at a central portion thereof an abutment holder 78 in the form of an annular projection. The abutment holder 78 is adapted to be abutted against a clamping plate 32 of a disc 12 received in the cartridge shell 10 to hold it thereon.

The shell receiver 76 of each of the support elements 74 includes an L-shaped side portion and a bottom portion which cooperate with each other to support each of corners of the cartridge shell 10. The support elements 74 each are formed integrally with the casing body 64 so as to be projected from an inner surface of the bottom of the casing body 64. The casing body 64 is formed with cuts 82 of a U-like shape, each of which is arranged in a manner to extend along a periphery of each of support elements 74, so that the support element 74 may be elastically deformed.

The abutment holder 78 is formed into a height substantially equal to a height of each of brushes 20 provided on the disc 12 so as to be positioned between the disc 12 and the cartridge shell 10 or more. The height of the holder 78 is, for example, 2 to 5 mm and preferably 2.5 to 4.0 mm. The height is determined depending on a length of fillings of the brush 20.

In FIG. 21, reference numeral 84 designates the cleaning disc cartridge received in the casing of the illustrated embodiment.

Figure 23:
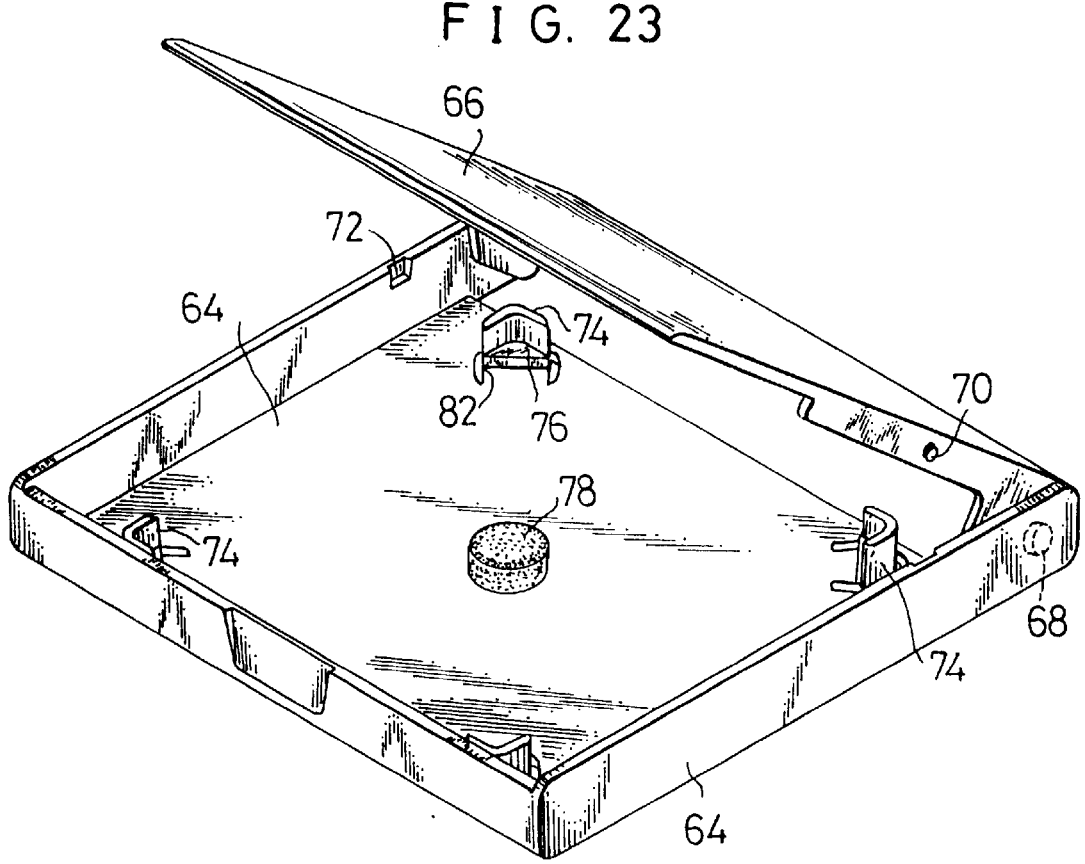
FIG. 23 is a perspective view showing a modification of the casing of FIG. 20.
Figure 24:
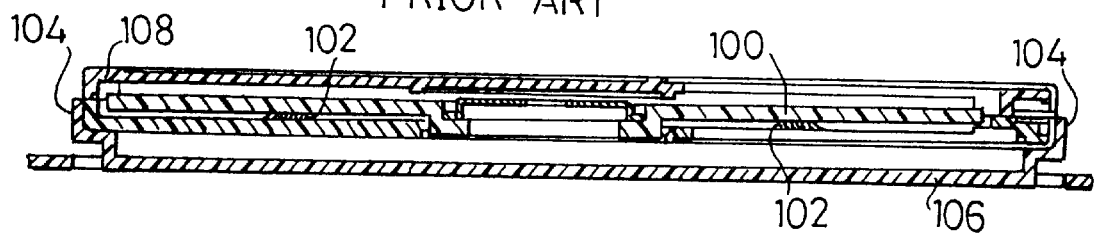
FIG. 24 is a vertical sectional view showing a conventional casing for a cleaning disc cartridge.

FIG. 23 shows a modification of the casing of FIG. 20. A casing of the modification is constructed in such a manner that an abutment holder 78 for holding the clamping plate 80 of the disc 12 is formed of an elastic material into a projection of a cylindrical shape. For example, it is formed of a cylindrical sponge member and mounted to a central portion of an inner surface of a bottom of a casing body 64. Such construction of the abutment holder 78 permits it to elastically upwardly force a clamping plate of a rotating disc. Therefore, when a cartridge shell having the rotating disc provided thereon with a lens cleaning brush received therein is housed in the casing, the abutment holder 78 forces the disc in a direction away from the lens cleaning member or brush, to thereby define a gap between the cartridge shell of the disc cartridge and a surface of the casing opposite to the brush, resulting in preventing deformation of the brush. Also, elasticity of the abutment holder 78 prevents damage to the disc cartridge due to application of vibration thereto or the like.

As can be seen from the foregoing, the casing of the illustrated embodiment is so constructed that the support elements 74 which are arranged in the casing body 64 so as to be opposite to each other each include the shell receiver 76 and the abutment holder 78 is projectedly formed in an annular or cylindrical on the bottom of the casing body. Thus, the casing effectively prevents deformation of the brush, facilitates handling of the disc cartridge and ensures safety of the disc cartridge for a long period of time.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A cleaning disc cartridge for an optical disc apparatus, comprising:
    a cartridge shell formed with an opening for an optical pickup;
    a rotating disc rotatably received in said cartridge shell; and
    at least one cleaning member provided on a surface of said rotating disc opposite to an objective lens of the optical disc apparatus;
    said cleaning member including a plurality of spun yarns planted on said surface of said rotating disc in a brush-like manner, an axis of each spun yarn extending perpendicularly from said surface of said rotating disc, each spun yarn being formed of a plurality of fiber bundles by spinning the plurality of fiber bundles, which fiber bundles are each formed of a plurality of fine fibers, the fiber bundles being wound together to wrap about each other as they extend from said surface to a tip of the spun yarn, whereby a durable cleaning disc cartridge is provided.

2. A cleaning disc cartridge as defined in claim 1, wherein said spun yarns are arranged in such a manner that fillings formed of said spun yams so as to be projected from said surface of said rotating disc each have a length of 0.3 to 1.5 mm for contact with the objective lens of the optical disc apparatus.

3. A cleaning disc cartridge as defined in claim 1, wherein said fibers are 0.1 to 0.5 denier in size.

4. A cleaning disc cartridge as defined in claim 1, wherein said rotating disc includes a disc body provided thereon with an information region on which optical information or an optical signal is stored.

5. A cleaning disc cartridge as defined in claim 4, wherein said information region of said disc body includes an inventory region and a reproduction-only region defined on an outer peripheral side of said inventory region;
    said cleaning member being arranged on a region of said disc body defined outside said inventory region;
    at least a part of said reproduction-only region being positioned on an outside of said region of said disc body on which said cleaning member is arranged.

6. A cleaning disc cartridge as defined in claim 5, wherein said region of said disc body on which said cleaning member is arranged is a skip area formed in said reproduction-only region.

7. A cleaning disc cartridge as defined in claim 5, wherein said region of said disc body on which said cleaning member is arranged is a skip area formed between said inventory region and said reproduction-only region.

8. A cleaning disc cartridge for an optical disc apparatus, comprising:
    a cartridge shell formed with a magnetic head insertion opening and an opening for an optical pickup;
    a rotating disc rotatably received in said cartridge shell;
    at least one first cleaning member arranged on one surface of said rotating disc opposite to an objective lens of the optical disc apparatus including a plurality of spun yarns planted on said surface of said rotating disc in a brush-like manner, an axis of each spun yarn extending perpendicularly from said surface of said rotating disc, each spun yarn being formed of a plurality of fiber bundles by spinning the plurality of fiber bundles, which fiber bundles are each formed of a plurality of fine fibers, the fiber bundles are wound together to wrap about each other as they extend from said surface to a tip of the spun yarn, whereby a durable cleaning disc cartridge is provided; and
    a second cleaning member arranged on the other surface of said rotating disc opposite to a magnetic head of the optical disc apparatus.

9. A cleaning disc cartridge as defined in claim 8, wherein said second cleaning member includes pile-like raised elements formed of fine fibers.

10. A cleaning disc cartridge as defined in claim 8, wherein said second cleaning member is formed with a thickness of 0.5 mm or less.

11. A cleaning disc cartridge as defined in claim 8, wherein said rotating disc includes a disc body which is formed thereon with an information region on which optical information or an optical signal is stored.

12. A cleaning disc cartridge as defined in claim 11, wherein said information region of said disc body includes an inventory region, a reproduction-only region defined on an outer peripheral side of said inventory region, and an information recording and reproducing region defined on an outer peripheral side of said reproduction-only region;
    said first cleaning member being arranged at a region of said disc body defined outside said inventory region;
    at least a part of said reproduction-only region being positioned on an outside of said region of said disc body on which said first cleaning member is arranged;
    said second cleaning member being arranged at at least said information recording and reproducing region of said the other surface of said disc body.

13. A cleaning disc cartridge as defined in claim 12, wherein said region of said disc body on which said first cleaning member is arranged is a skip area formed in said reproduction-only region.

14. A cleaning disc cartridge as defined in claim 12, wherein said region of said disc body on which said first cleaning member is arranged is a skip area formed between said inventory region and said reproduction-only region.

15. A cleaning disc cartridge for an optical disc apparatus, comprising:

a cartridge shell formed with an opening for an optical pickup;

a rotating disc rotatably received in said cartridge shell; and at least one first cleaning member arranged on one surface of said rotating disc opposite to an objective lens of the optical disc apparatus including a plurality of spun yarns planted on said surface of said rotating disc in a brush-like manner, an axis of each spun yarn extends perpendicularly from said surface of said rotating disc, each spun yarn being formed of a plurality of fiber bundles by spinning the plurality of fiber bundles, which fiber bundles are each formed of a plurality of fine fibers, the fiber bundles are wound together to wrap about each other as they extend from said surface to a tip of the spun yarn, whereby a durable cleaning disc cartridge is provided.

\* \* \* \* \*